United States Patent
Hsu et al.

(10) Patent No.: US 7,570,023 B2
(45) Date of Patent: Aug. 4, 2009

(54) METHOD OF CHARGING BATTERIES

(75) Inventors: Deng-Hsien Hsu, Taipei (TW);
Wen-Ping Tsai, Taipei (TW);
Zong-Long Yu, Shanghai (TW)

(73) Assignee: Aeneas Energy Technology Co., Ltd., Taipei (TW)

( * ) Notice: Subject to any disclaimer, the term of this patent is extended or adjusted under 35 U.S.C. 154(b) by 393 days.

(21) Appl. No.: 11/652,545

(22) Filed: Jan. 12, 2007

(65) Prior Publication Data

US 2008/0030168 A1  Feb. 7, 2008

(30) Foreign Application Priority Data

Aug. 1, 2006 (TW) ............................... 95128136 A

(51) Int. Cl.
*H02J 7/00* (2006.01)
*H02J 7/16* (2006.01)
*G01N 27/416* (2006.01)

(52) U.S. Cl. .................. 320/132; 320/116; 320/120; 320/122; 320/162; 324/433; 324/434

(58) Field of Classification Search .................. 320/116, 320/118, 119, 120, 121, 122, 130, 132, 134, 320/136, 157, 162; 324/426, 433, 434
See application file for complete search history.

(56) References Cited

U.S. PATENT DOCUMENTS 5,760,587 A * 6/1998 Harvey ........................ 324/434
5,994,874 A * 11/1999 Hirose ........................ 320/125
5,994,875 A * 11/1999 Lee ............................. 320/132

* cited by examiner

*Primary Examiner*—Akm E Ullah
*Assistant Examiner*—Johali A Torres Ruiz
(74) *Attorney, Agent, or Firm*—Muncy, Geissler, Olds & Lowe, PLLC

(57) ABSTRACT

In a method of charging batteries, a microcontroller and a series divider resistor are used to control the level of a charge current source supplied from a power supply, so that a plurality of serially connected batteries in a battery pack could be best charged. The microcontroller detects a voltage value of the battery pack via the series divider resistor. When all the batteries in the battery pack have been charged in a first charging cycle, the microcontroller controls the power supply to lower the output charge current and to charge the batteries in a second charging cycle, until the charge has been cycled a preset number of times. As a result, all the serially connected batteries in the battery pack are best charged.

8 Claims, 2 Drawing Sheets

METHOD OF CHARGING BATTERIES

FIELD OF THE INVENTION

The present invention relates to a method of charging batteries, and more particularly to a method of charging batteries, in which a microcontroller and a series divider resistor are used to control the charging of a plurality of serially connected batteries via a power supply, so that all the batteries are best charged.

BACKGROUND OF THE INVENTION

With the quickly increased demands for all kinds of portable electronic products, such as digital camera, personal digital assistant (PDA), MP3, etc., there are also increasing demands for high-capacity rechargeable batteries that can be fully charged within a largely shortened time with a compact and lightweight charger that has low manufacturing cost and long service life. Most of the currently available battery chargers are CC/CV battery chargers, namely, constant current/constant voltage battery chargers that combine the constant current charging and the constant voltage charging technique to charge batteries or battery packs.

There is also a pulse charging technique that uses constant current to charge batteries and checks the charge voltage status at the battery end, and then increases or decreases a pulse width modulation signal based on the obtained charge voltage status, so as to control and regulate from time to time the output to the batteries during charging. In this manner, it is possible to dynamically adjust the average charge current to the batteries.

However, in the CC/CV charging technique, a large number of detecting points is required, and detecting devices for this purpose must be high-precision to inevitably largely increase the manufacturing cost of the charger. On the other hand, in the pulse charging technique, a highly strict requirement is set for the battery cell protective IC during the course of pulse charging, and the pulse charging circuit is complicate and therefore not convenient for use.

It is therefore tried by the inventor to develop a method of charging batteries to overcome the disadvantages existed in the conventional battery charging techniques, so that a simplified and cost-reduced charging circuit enabling upgraded accuracy of battery charge may be obtained.

SUMMARY OF THE INVENTION

A primary object of the present invention is to provide a method of charging batteries, in which a microcontroller and a series divider resistor are used to enable largely simplified and cost-reduced charging circuit and upgraded battery charging accuracy.

To achieve the above and other objects, the method of charging batteries according to the present invention includes the following steps:

(1) Form a battery pack from a plurality of serially connected batteries, and serially connect the battery pack to a power supply;

(2) Form a series divider resistor by serially connecting a first divider resistor to a second divider resistor, and parallelly connect the series divider resistor to the battery pack;

(3) Connect a microcontroller to the power supply, and parallelly connect the microcontroller to the second divider resistor;

(4) Cause the microcontroller to send out a first control signal to the power supply, so that the power supply supplies a constant charge current source to the battery pack;

(5) When any one of the batteries in the battery pack is charged to a first preset voltage value, the battery pack disconnects that battery from a corresponding charging circuit thereof;

(6) The microcontroller detects via the series divider resistor a voltage value of the battery pack; when the detected voltage value is smaller than a second preset voltage value, or when a FULL signal output by the battery pack is received, the microcontroller outputs a RESET signal to all charging circuits, so that all the charging circuits are closed again; and (7) Determine whether the number of times the RESET signal has been output has reached a preset value; if yes, power from the power supply is interrupted by the microcontroller to stop charging the batteries; and if not, a second control signal is output by the microcontroller to the power supply, so that the power supply lowers the constant charge current source, and the charging returns to the step (4).

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
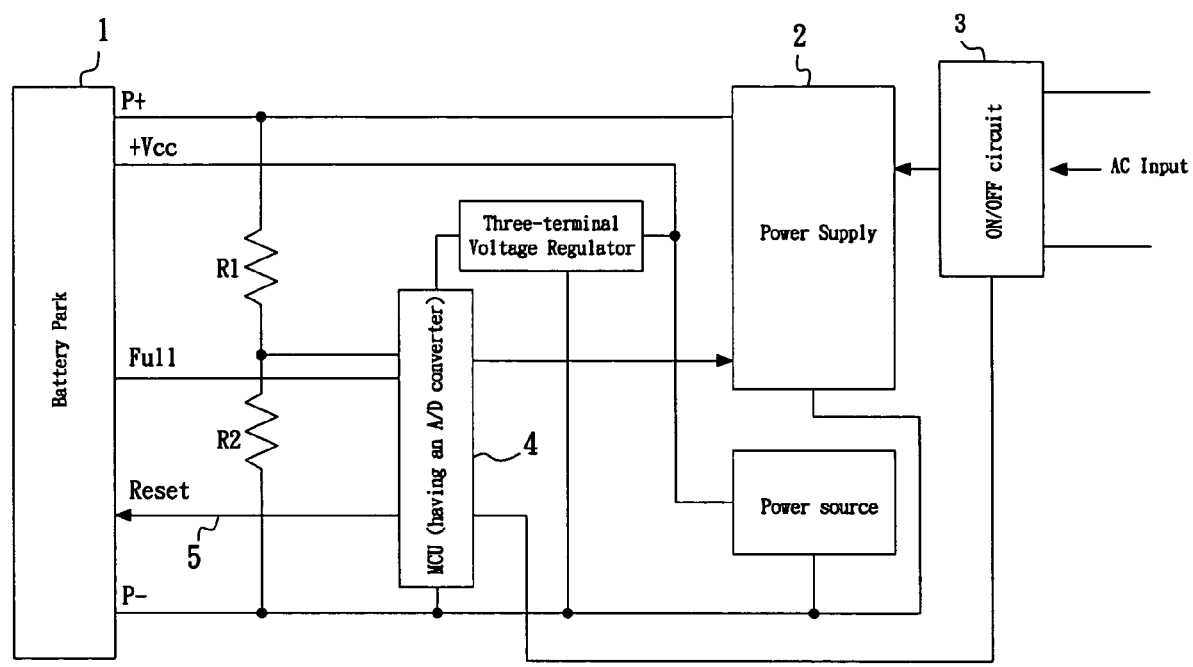
FIG. 1 is a schematic view showing a method of charging batteries according to a preferred embodiment of the present invention.

Please refer to FIG. 1 that is a schematic view showing a method of charging batteries according to a preferred embodiment of the present invention. As shown, in the method of the present invention, a plurality of batteries are serially connected to form a battery pack 1, and the battery pack 1 is serially connected to a power supply 2, which may include but not limited to a stepped variable charger, a linear variable charger, etc. Wherein, the batteries may be high-capacity capacitors or Li-ion batteries. In addition, a first divider resistor R1 and a second divider resistor R2 are serially connected to form a series divider resistor, and the series divider resistor is parallelly connected to the battery pack 1. Thereafter, a microcontroller 4 having an analog-digital (A/D) converter (not shown) is connected to the power supply 2 while being parallelly connected to the second divider resistor R2. The microcontroller 4 may obtain a total terminal voltage value of the battery pack 1 from the second divider resistor R2, and then sends out a first control signal, which may include but not limited to a logic value, to the power supply 2 for the latter to supply a constant charge current source. When any one of the batteries in the battery pack 1 is charged to a first preset voltage value, the battery pack disconnects that battery from a corresponding charging circuit (not shown) thereof, so that the voltage of that battery is deducted from the total terminal voltage value, and the charge current source does not flow to that battery but to a following battery via a by-pass circuit parallelly connected to that battery. Via the series divider resistor, the microcontroller 4 may detect a voltage value P+, P− of the battery pack 1. When the detected voltage value P+, P− is smaller than a second preset voltage value, or when an effective FULL signal output by the battery pack 1 is received, a RESET signal 5, which may include but not limited to a logic value, is output by the microcontroller 4 to all charging circuits (not shown), so that all the charging circuits are closed again. Thereafter, it is determined whether the number of times the RESET signal 5 has been output has reached a preset value. If yes, power from the power supply 2 is interrupted by the microcontroller 4 via an ON/OFF circuit 3 to stop charging the batteries; and if not, a second control signal, which may include but not limited to a logic value, is output by the microcontroller 4 to the power supply 2, so that the power supply 2 lowers the constant current source output thereof and resumes charging the batteries in the battery pack 1. In this manner, the charge is cycled until all the batteries in the battery pack 1 are best charged.

Figure 2:
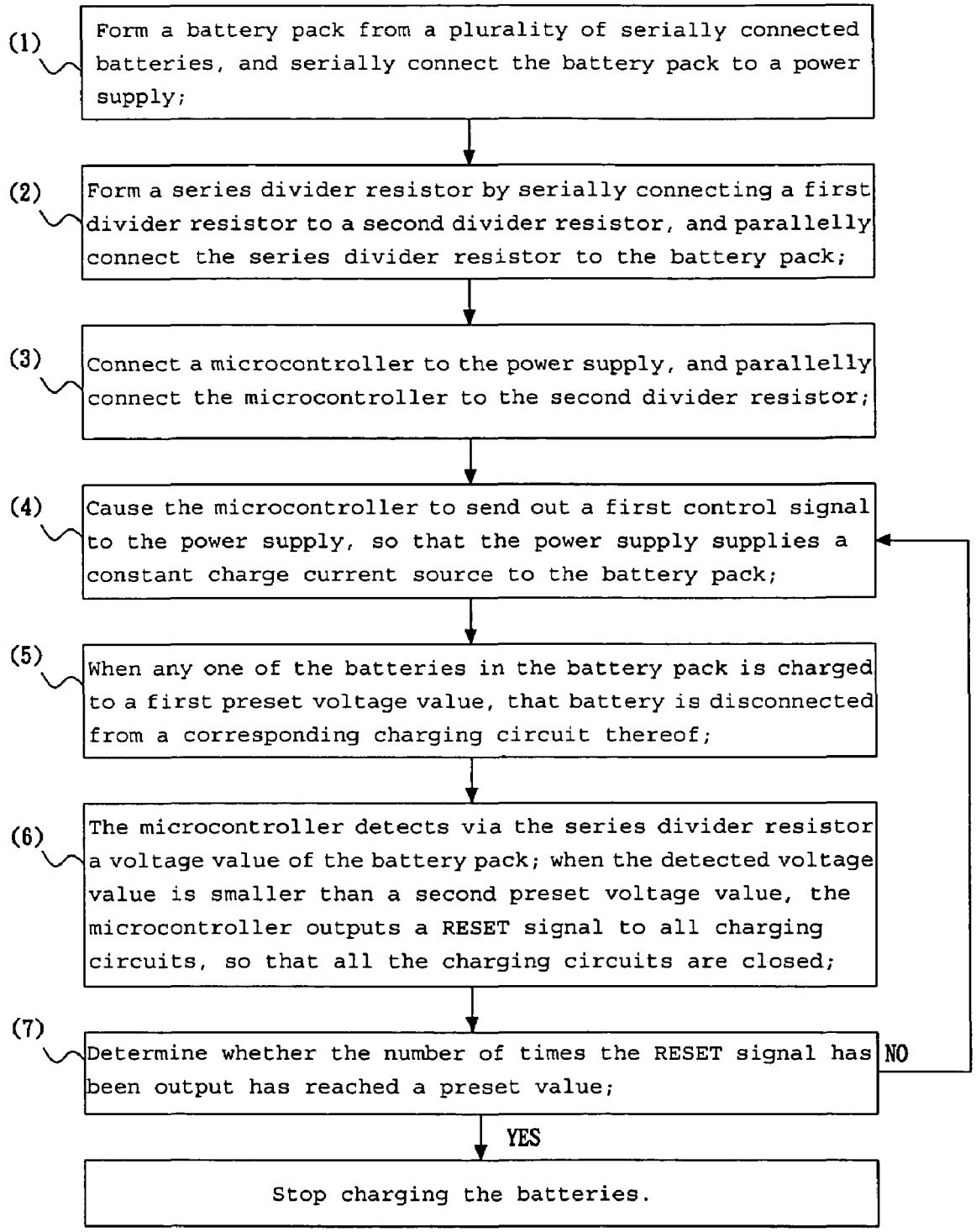
FIG. 2 is a flowchart showing the steps included in the method of the present invention.

FIG. 2 is a flowchart showing the steps included in the method of charging batteries according to the present invention. Please refer to FIG. 2 along with FIG. 1. The method of the present invention includes the following steps:

(1) Form a battery pack 1 from a plurality of serially connected batteries, and serially connect the battery pack 1 to a power supply 2, wherein the power supply 2 may include but not limited to a stepped variable charger, a linear variable charger, etc.;

(2) Form a series divider resistor by serially connecting a first divider resistor R1 to a second divider resistor R2, and parallelly connect the series divider resistor to the battery pack 1;

(3) Connect a microcontroller 4 having an analog-digital (A/D) converter (not shown) to the power supply 2, and parallelly connect the microcontroller 4 to the second divider resistor R2, so that the microcontroller 4 may obtain from the second divider resistor R2 a total terminal voltage value of the battery pack 1;

(4) Cause the microcontroller 4 to send out a first control signal, which may include but not limited to a logic value, to the power supply 2, so that the power supply 2 supplies a constant charge current source;

(5) When any one of the batteries in the battery pack 1 is charged to a first preset voltage value, the battery pack 1 disconnects that battery from a corresponding charging circuit (not shown) thereof, so that the voltage of that battery is deducted from the total terminal voltage value, and the charge current does not flow to that battery but to a following battery via a by-pass circuit parallelly connected to that battery;

(6) The microcontroller 4 detects via the series divider resistor a voltage value P+, P− of the battery pack 1; when the voltage value P+, P− is smaller than a second preset voltage value, or when a FULL signal output by the battery pack 1 is received, the microcontroller 4 outputs a RESET signal 5, which may include but not limited to a logic value, to all charging circuits (not shown), so that all the charging circuits are closed again; and (7) Determine whether the number of times the RESET signal 5 has been output has reached a preset value; if yes, power source from the power supply 2 is interrupted by the microcontroller 4 via an ON/OFF circuit 3 to stop charging the batteries; and if not, a second control signal, which may include but not limited to a logic value, is output by the microcontroller 4 to the power supply 2, so that the power supply 2 lowers the constant charge current source output thereof, and the charging returns to the step (4).

The present invention has been described with a preferred embodiment thereof and it is understood that many changes and modifications in the described embodiment can be carried out without departing from the scope and the spirit of the invention that is intended to be limited only by the appended claims.

What is claimed is:

1. A method of charging batteries, comprising the following steps:
    (1) Form a battery pack from a plurality of serially connected batteries, and serially connect the battery pack to a power supply;
    (2) Form a series divider resistor by serially connecting a first divider resistor to a second divider resistor, and parallelly connect the series divider resistor to the battery pack;
    (3) Connect a microcontroller to the power supply, and parallelly connect the microcontroller to the second divider resistor;
    (4) Cause the microcontroller to send out a first control signal to the power supply, so that the power supply supplies a constant charge current source to the battery pack;
    (5) When anyone of the batteries in the battery pack is charged to a first preset voltage value, the battery pack disconnects that battery from a corresponding charging circuit thereof;
    (6) The microcontroller detects via the series divider resistor a voltage value of the battery pack; when the detected voltage value is smaller than a second preset voltage value, or when a FULL signal out put by the battery pack is received, the microcontroller outputs a RESET signal to all charging circuits, so that all the charging circuits are closed; and
    (7) Determine whether the number of times the RESET signal has been output has reached a preset value; if yes, power from the power supply is interrupted by the microcontroller to stop charging the batteries; and if not, a second control signal is output by the microcontroller to the power supply, so that the power supply lowers the constant charge current source output thereof, and the charging returns to the step (4).

2. The method of charging batteries as claimed in claim 1, wherein the batteries are selected from the group consisting of high-capacity capacitors and Li-ion batteries.

3. The method of charging batteries as claimed in claim 1, wherein the power supply is selected from the group consisting of a stepped variable charger and a linear variable charger.

4. The method of charging batteries as claimed in claim 1, wherein the RESET signal is a logic value.

5. The method of charging batteries as claimed in claim 1, wherein the first control signal is a logic value.

6. The method of charging batteries as claimed in claim 1, wherein the second control signal is a logic value.

7. The method of charging batteries as claimed in claim 1, wherein the microcontroller includes an analog-digital converter.

8. The method of charging batteries as claimed in claim 1, wherein the constant charge current source is a constant current source that allows current setting.

* * * * *